United States Patent [19]
Baldi

[11] Patent Number: 5,551,861
[45] Date of Patent: Sep. 3, 1996

[54] QUICK CHANGE MOLD FOR BLOW MOLDING APPARATUS

[75] Inventor: Massenzio Baldi, Florence, Italy

[73] Assignee: Hoover Universal, Inc., Plymouth, Mich.

[21] Appl. No.: 374,682

[22] PCT Filed: Jul. 30, 1993

[86] PCT No.: PCT/US93/07210
  § 371 Date: Jan. 27, 1995
  § 102(e) Date: Jan. 27, 1995

[87] PCT Pub. No.: WO94/03320
  PCT Pub. Date: Feb. 17, 1994

[30] Foreign Application Priority Data

Jul. 31, 1992 [IT] Italy ................... FI92A156

[51] Int. Cl.[6] ........................................ B29C 49/50
[52] U.S. Cl. ................... 425/527; 425/531; 425/534; 425/535; 425/806
[58] Field of Search ............................ 425/185, 182, 425/527, 531, 534, 535, 806, 192 R, 522

[56] References Cited

U.S. PATENT DOCUMENTS

| | | | |
|---|---|---|---|
| 3,583,031 | 6/1971 | Kader et al. | 425/534 X |
| 3,659,998 | 5/1972 | Saffron | 425/535 |
| 4,552,526 | 11/1985 | Hafele | 425/522 |

*Primary Examiner*—Richard L. Chiesa
*Attorney, Agent, or Firm*—Harness, Dickey & Pierce, P.L.C.

[57] ABSTRACT

Tooling for a quick change of molds and associated accessories for a blow molding machining for blow molding hollow plastic articles or articles, including a mold (2) that can be opened, with a feed opening (20) for introducing compressed air, an air injection nozzle (4) for the passage of compressed air, a nest (5) to hold the articles (31) after being produced and released by the mold, trim tooling (6) for the removal of the flash (32), characterized by the mold, the nest and the trim tooling being supported by two parallel opposing, spaced apart supporting plates (10), which constitute a modular assembly (1) that is movable lengthwise by a corresponding carriage (50), and by the fact that the air injection nozzle for the introduction of compressed air into the mold is assembled on a movable, self-retaining support (40).

10 Claims, 3 Drawing Sheets

QUICK CHANGE MOLD FOR BLOW MOLDING APPARATUS

TECHNICAL FIELD

This invention relates to a quick change mold tooling arrangement for blow molding apparatus used for producing hollow plastic articles.

BACKGROUND ART

It is known that in any industrial sector there is the need for production lines which are characterized by a high degree of flexibility so that they can be retooled rapidly in order to adjust production runs to the variable demands and conditions of the market, both as to the quantity and the type of the items being produced.

Such a need is deeply felt in the art of machines for producing hollow plastic items that contemplate the replacement of molds, where molding particularly blow molding, takes place, so as to allow the changing of shape and/or structure of the produced items using only one blow molding machine.

Known blow molding machines for producing hollow plastic articles include at least one mold having a mold cavity with the shape of the article to be produced, the mold being adapted to be opened and closed. The mold is opened to receive a preform or parison and then closed. After the mold has been closed, compressed air is introduced into the parison contained within the mold through a compressed air feed inlet and a corresponding feed nozzle to carry out the blowing of the parison which is expanded and conformed to the inner wall of the mold cavity to acquire the desired shape. The blow molding machine includes at least one nest or dolly, divided in two sections, that holds the article after being blown and when it has been released by the mold. The machine further includes trim tooling for removing the flash from the article. Also, the machine includes several feed lines for supplying cooling water to the mold and lines for supplying compressed air to the nozzles.

The following operations are required to change the mold and associated accessories: disassemble the group of dollies; disassemble the trim tooling; disconnect the cooling lines of the water cooling system for the molds; disassemble the molds; disconnect the compressed air lines; disassemble the air feed nozzles; reassemble the new tooling; adjust the center distance between the mold and the nest or dolly in the new tooling; adjust the position of the trim tooling in the new tooling; and align the axis of the air feed nozzles with that of the compressed air inlets in the new mold.

It is evident that such a large number of operations requires time and numerous different tools, that is in contrast with the necessity of a rather flexible machine.

Moreover, because it is also necessary to employ specially trained personnel, particularly as far as making adjustments is concerned, the operative costs of such a working station are very high, especially when compared with the relatively low price of the finished item.

DISCLOSURE OF THE INVENTION

The object of the invention is to eliminate the above-mentioned inconveniences and to simplify the assembly and the disassembly associated with the replacement of the molds and associated tooling in a blow molding machine for producing hollow plastic articles.

This result is achieved by the invention, by providing a modular tooling assembly which includes a mold, a nest or dolly, and trim tooling for the removal of the flash, wherein the mold, the nest and the trim tooling are assembled to two parallel opposing plates, which are adapted to be moved apart, which make up the modular assembly that facilitates mold replacement, and wherein the blowing nozzles are mounted on a removable self-bearing support.

Essentially, the advantages are represented by the very easy and fast replacement of molds and associated tooling due to the fact that the number of operations and adjustment to be carried out is drastically reduced; to the fact that such a replacement can be also performed by nonspecialized personnel, resulting in significant reduction in the operative costs of the working station; and by the fact that automation of the mold replacement is possible especially in the case of machine for high capacity production.

These and other advantages and characteristics of the invention can be better understood by one skilled in the art through the following description and drawings.

DESCRIPTION OF PREFERRED EMBODIMENTS

Figure 1:
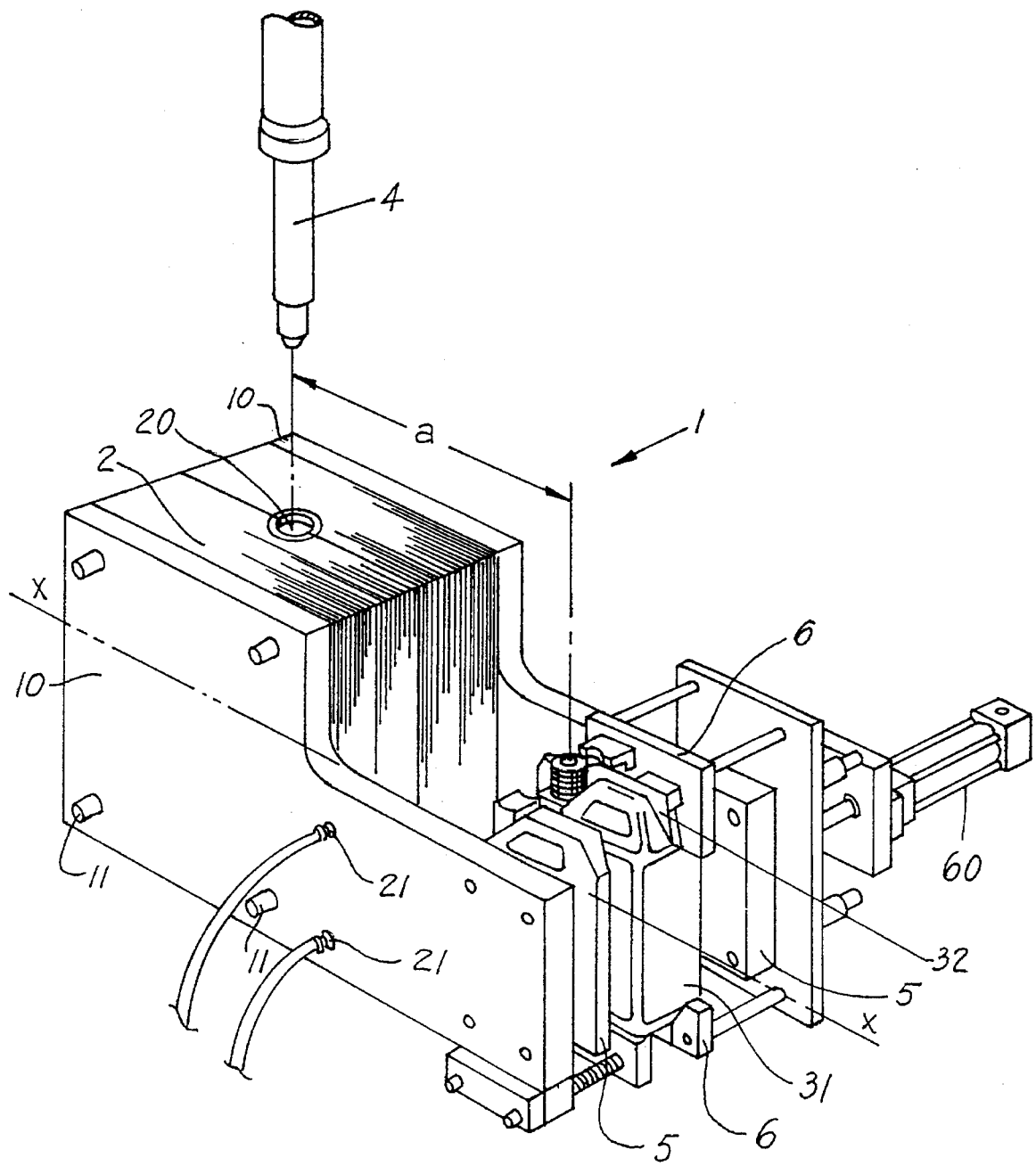
FIG. 1 is a perspective view of a modular tooling assembly for quick change of molds, including a mold having a single air feed inlet, with the mold shown in the closed condition.
Figure 2:
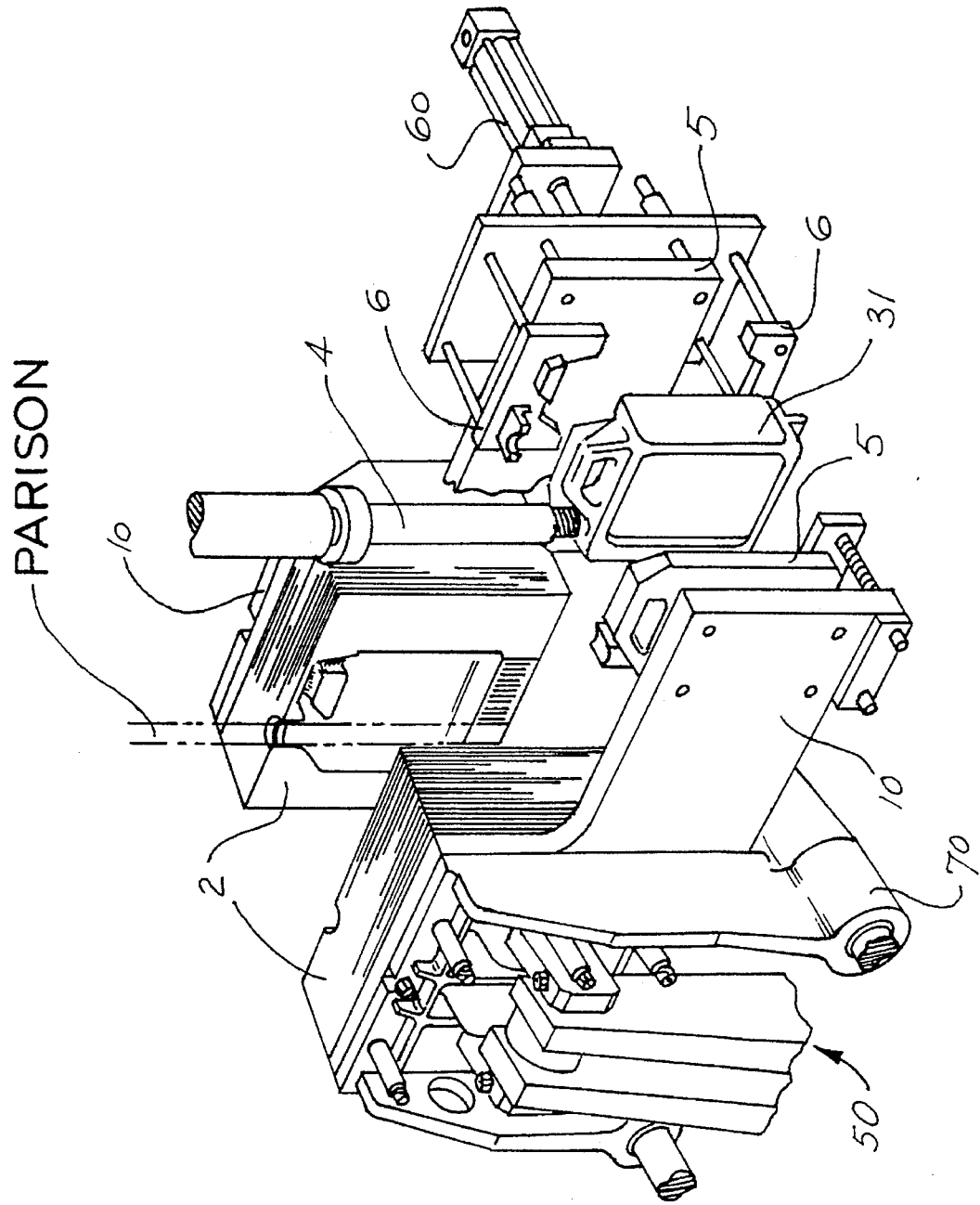
FIG. 2 a perspective view of the modular tooling assembly for quick change of molds of FIG. 1, but with the mold shown in the open condition.

When reduced to the essential structure and with reference to FIGS. 1 and 2 of the drawings, the modular tooling arrangement for quick change of molds and associated accessories in a blow molding machine for producing hollow plastic articles, includes a mold 2 adapted to be opened and closed, the mold having a compressed air feed inlet 20 for the introduction of compressed air through a corresponding blow pin or nozzle 4; a nest or dolly 5 that can be opened to receive a blown article and to hold the blown article 31 after it has been released by the mold 2; and a two-part trim tooling or hollow punches 6 for the removal of the flash. The two parts of the mold 2 and the nest 5 and the trim tooling 6 are fixed to two external widely spaced apart, parallel opposing supporting plates 10 so as to provide a modular assembly or monoblock group 1 which is made movable lengthwise by the corresponding carriage 50 of the machine. The distance "a" between the vertical axis of the compressed air feed inlet 20 engages of the mold 2 and the median vertical axis of the nest 5 is preset, that is, adjusted before the modular assembly 1 is assembled on the machine. The nozzle 4 is mounted on a removable, self-bearing support 40 as shown in FIG. 3.

Figures 3, 4:
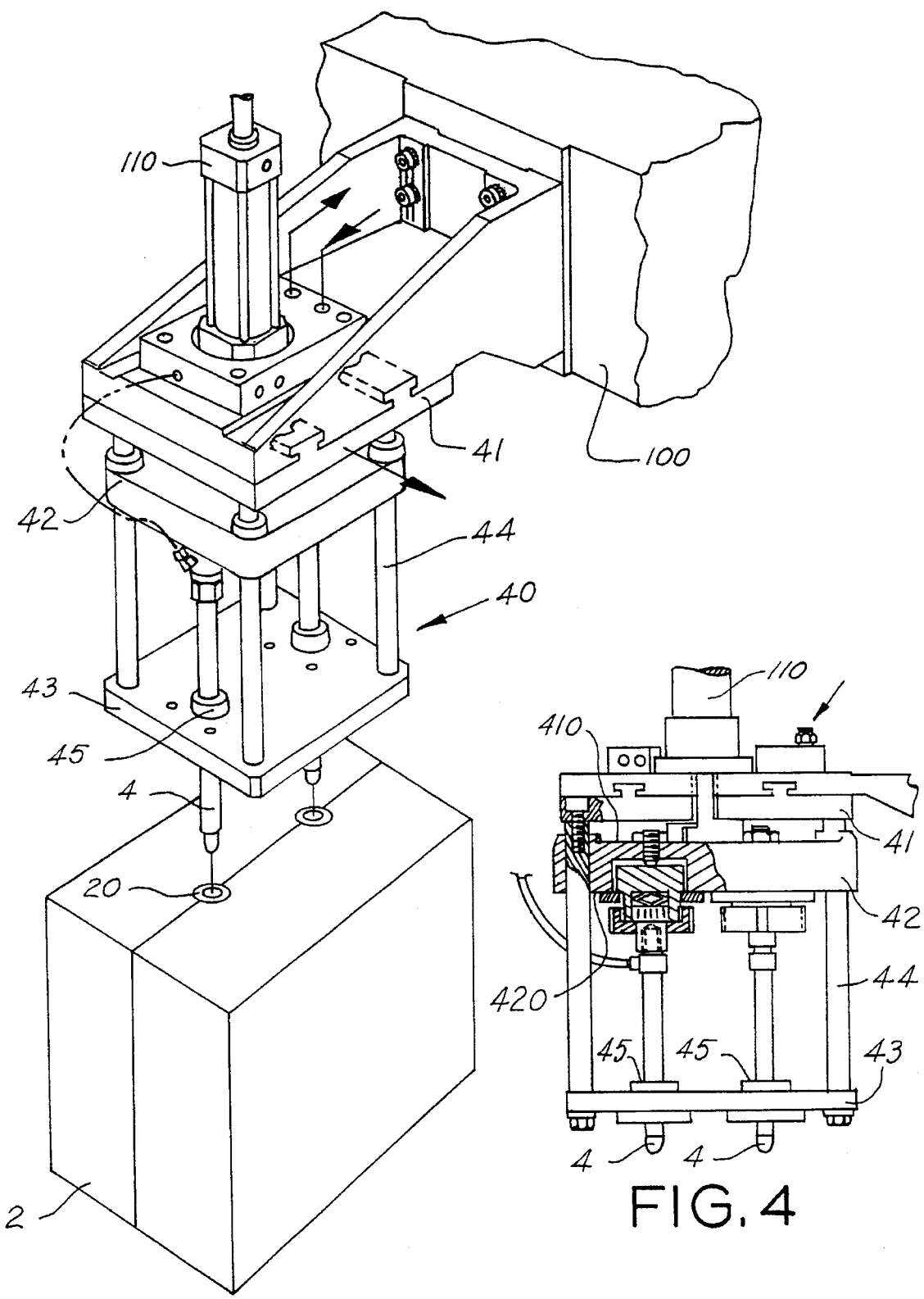
FIG. 3 is a perspective view of a support with two nozzles for a mold having two air feed inlets.
FIG. 4 is a cross-section view of the nozzle holding support of FIG. 3.

Referring to FIGS. 3 and 4, such a support 40 is made up with a frame including a removably mounted plate 41 which is connected at the top to a fixed part or section 100 of the machine, and at the bottom to four vertical rods 44 for guiding another plate 42 on whose back 410 there is the head of the stem of a corresponding operating cylinder 110 having a vertical axis, the lower side 420 of which is in contact with the base of the nozzle 4 so as to allow the actuation, that is the insertion into and the withdrawal from, the compressed air feed inlet 20 of the mold 2. A third plate 43 equipped with a guide boss 45 for the stem of the nozzle 4 is fixed to the lower ends of the above-mentioned vertical rods 44. Furthermore, advantageously, the position of the nozzle 4 with respect to the compressed air feed inlet 20 of the corresponding mold 2 is preset. In other words, it is adjusted before the modular assembly 1 and the support 40 are assembled on the machine.

The trim tooling 6 are coupled to means of motion in an orthogonal direction with respect to that the direction of translation x—x of the modular assembly 1.

According to the invention, these means of motion of the trim tooling 6 include a cylindrical actuator 60 with its axis orthogonal to the motion of translation x—x of the modular assembly 1.

As an alternative, the trim tooling 6 are assembled on an independent carriage, not illustrated, which is adapted to be assembled and replaced along the modular assembly 1.

When the mold 2 needs to be replaced, the water lines 21 for cooling water and air lines for compressed air are disconnected, and then the whole modular assembly 1 is removed, without disassembling each component. A new modular assembly, with an associated mold 2, nest 5 and trim tooling 6, is mounted in its place. Also, the support 40 for the nozzle 4 is totally replaced with no need for disassembling each component and no need for a new adjustment of the position of the nozzle 4 with respect to the compressed air feed inlet 20.

According to an alternative embodiment and with reference to FIGS. 3 and 4, this invention contemplates an embodiment of a mold 2 with two compressed air inlets 20 for the introduction of compressed air, which is fed through two corresponding blow pins or nozzles 4 in order to allow, for example, the simultaneous blowing of two articles in two separate and distinct mold cavities.

Obviously, the number of compressed air inlets 20 of a mold 2 and associated blowing nozzles 4 may vary according to the size and shape of the item being manufactured.

Referring again to FIGS. 1 and 2, the plates 10 which support the mold 2, the nest 5 and the trim tooling 6 are equipped with two connectors 21 for the quick connection of the water lines to the cooling water system.

The plates are also equipped with several parallel, transversely extending plugs or guide rods 11 which represent elements of guidance and linkage to corresponding drive means 70 that moves the plates 10 apart and together.

When in operation, the machine functions as follows. After the preform or parison 31 has been blown and solidified inside the mold 2, the plates 10 are moved apart and the article 31, with associated flash 32 still attached, hangs from the opening of the nozzle 4. The carriage 50 is activated so as to move the modular assembly 1 as a unit. The nest is positioned in correspondence with the nozzle 4. At this stage, the plates 10 are moved together, or closed, and the nest 5 holds the article 31. At the same time, the nozzle is lifted and is separated from the article. After the plates are closed, the cylinder 60 activates the trim tooling 6 which push or knock the flash 32 from the article.

In summary the details of the operation may vary according to the shape, size, arrangement of the elements, and composition of the material being used without, however, changing the solution and scope of the claims.

We claim:

1. Tooling for quick change of molds and accessories in a blow molding machine for blow molding hollow plastic articles, which includes a mold that can be opened and closed; said mold having a feed opening or inlet for compressed air; a nozzle for compressed air feeding; a nest for holding the hollow plastic article after being blown and released from the mold; trim tooling for the removal of flash; and a carriage for providing relative movement between said nozzle and said mold and nest, comprising said mold, said nest, and said trim tooling being supported by two spaced apart, parallel and opposing supporting plates forming a modular assembly; said modular assembly having means for securing said modular assembly as a unit to said carriage, enabling said modular assembly to be moved as a unit lengthwise by said carriage relative to the nozzle between a first position at which the nozzle is aligned with the vertical axis of said feed opening or inlet of said mold and a second position at which the nozzle is aligned with a median vertical axis of said nest; and said compressed air feeding nozzle is assembled on a removable self-bearing support, the mouth of said mold, said nest, and said trim tooling on said supporting plates enabling a distance "a" between the vertical axis of said feed opening or inlet of said mold and said median vertical axis of said nest and the alignment of said trim tooling relative to said median vertical axis of said nest to be established prior to the assembly of the modular assembly on the blow molding machine, whereby when said modular assembly is mounted on the blow molding machine with said feed opening or inlet of said mold aligned with said nozzle at said first position, said median vertical axis of said nest and said trim tooling of the modular assembly are automatically located at said second position.

2. Tooling according to claim 1 wherein said support comprises a frame that includes a plate which on its upper side is removably connected to a fixed part of the machine, and on its lower side mounts four vertical rods for guiding a second plate on the back of which there is located the head of the stem of a corresponding cylinder which is operable along a vertical axis and the lower side of which is in contact with the base of the nozzle in order to allow the actuation of the nozzle, comprising the insertion of the nozzle into and the withdrawal of the nozzle from, respectively, the feed opening or inlet of the mold, and a third plate fixed to the lower parts of said vertical rods and equipped with a guide boss for the nozzle stem.

3. Tooling according to claim 1 wherein the position of said nozzle with respect to the feed opening or inlet of the corresponding mold is variable and is preset prior to the assembly of the modular assembly and the support on the blow molding machine.

4. Tooling according to claim 1 wherein said trim tooling includes means for moving said trim tooling in a direction that is orthogonal with respect to the direction of translation (X—X) of the modular assembly.

5. Tooling according to claim 4 wherein said means for moving the trim tooling includes a cylindrical actuator with its axis in orthogonal orientation with respect to the direction of translation (x—x) of the modular assembly.

6. Tooling according to claim 1 wherein said modular assembly includes a mold with two feed openings or inlets through which compressedair is fed from two corresponding nozzles (4).

7. Tooling according to claim 1 wherein the number of feed openings or inlets of said mold and the number of nozzles for blowing is dependent upon the size and shape of the article to be produced.

8. Tooling according to claim 1 wherein said supporting plates are equipped with several connectors for fast connection of cooling system lines to said mold assembly.

9. Tooling according to claim 1 wherein said supporting plates are equipped with several parallel and transverse projecting pins which comprise elements of guidance and linkage for a drive means of the carriage that moves said support plates together and apart, respectively closing and opening said mold and enabling said nest to grip and release, respectively, the blown article.

10. Tooling according to claim 4 wherein characterized by the fact that the carriage includes a drive means that moves said support plates together to close said mold and to enable said nest to grip the blown article, and said means for moving the trim tooling moves the trim tooling to remove flash from the blown article after the support plates have been moved together by the drive means.

* * * * *